(12) United States Patent
Hussami

(10) Patent No.: US 7,860,855 B2
(45) Date of Patent: Dec. 28, 2010

(54) METHOD AND SYSTEM FOR ANALYZING SIMILARITY OF CONCEPT SETS

(75) Inventor: Peter Hussami, Budapest (HU)

(73) Assignee: SAP AG, Walldorf (DE)

( * ) Notice: Subject to any disclaimer, the term of this patent is extended or adjusted under 35 U.S.C. 154(b) by 988 days.

(21) Appl. No.: 11/706,909

(22) Filed: Feb. 13, 2007

(65) Prior Publication Data

US 2008/0195587 A1    Aug. 14, 2008

(51) Int. Cl.
*G06F 17/30* (2006.01)
*G06F 7/00* (2006.01)

(52) U.S. Cl. ..................................... 707/708
(58) Field of Classification Search .............. 707/100, 707/101, 999.101, 999.1, 708
See application file for complete search history.

(56) References Cited

U.S. PATENT DOCUMENTS

| | | | | |
|---|---|---|---|---|
| 5,802,508 | A * | 9/1998 | Morgenstern | 706/55 |
| 6,594,658 | B2 | 7/2003 | Woods | |
| 2004/0117395 | A1 * | 6/2004 | Gong et al. | 707/101 |
| 2005/0278362 | A1 * | 12/2005 | Maren et al. | 707/100 |
| 2006/0106847 | A1 | 5/2006 | Eckardt et al. | |

OTHER PUBLICATIONS

"European Web Mining Forum (EWMF 2005)", International Workshop at the 16th European Conference on Machine Learning (ECML) and the 9th European Conference on Principles and Practice of Knowledge Discovery in Databases (PKDD) in Porto, Purtugal, (Oct. 3-7, 2005).

Knappe, Rasmus , "Measures of Semantic Similarity and Relatedness for Use in Ontology-based Information Retrieval", (2005).

Resnik,, P. , "Using information content to evaluate semantic similarity in a taxonomy", In Proceedings of the 14th International Joint Conference on Artificial Intelligence (IJCAI '95), pp. 448-453, Montreal, Aug. 1995.

Office Action Reponse for European Application No. 08002652.9-1527, filed on Jun. 2, 2009, 22 pages.

Office Action for European Application No. 08002652.9-1527, mailed on Apr. 1, 2009, 4 pages.

(Continued)

*Primary Examiner*—Khanh B Pham
*Assistant Examiner*—Navneet K Ahluwalia
(74) *Attorney, Agent, or Firm*—Brake Hughes Bellermann LLP

(57) ABSTRACT

A method and system are described for determining similar concept sets. An example method includes obtaining taxonomies, each including one root node and hierarchically ordered paths; receiving first and second sets each including set concepts; determining concept pairs, each including a first and second set concept; determining lengths of nondiverging intersections of first and second subpaths from the root node to first and second concept nodes, and associated lengths of first and second portions of the subpaths from a last concept node included in the nondiverging intersection to the first and second concept nodes; determining pairwise similarity values based on ratios based on associated lengths of nondiverging intersections and the associated lengths of the first and second portions; and determining a concept set similarity value based on a weighted sum of the pairwise similarity values associated with optimal selected ones of the concept pairs.

26 Claims, 7 Drawing Sheets

OTHER PUBLICATIONS

Response to Extended European Search Report for European Application No. 08002652.9-1527, filed on Oct. 1, 2008, 5 pages.
Extended European Search Report for European Application No. 08002652.9-1527, mailed on Jun. 12, 2008, 6 pages.
Varlamis, I., et al, "THESUS, A Closer View on Web Content Management Enhanced With Link Semantics", IEEE Transactions on Knowledge and Data Engineering, vol. 16, No. 6, Jun. 2004, 38 pages.

Wu, Z., et al, "Verb Semantics and Lexical Selection", 32nd Annual Meeting of the Association For Computational Linguistics, 1994, pp. 133-138.

Ganesan, P., et al, "Exploiting Hierarchical Domain Structures to Compute Similarity", ACM Transactions on Information Systems, vol. 21, No. 1, Jan. 2003, pp. 64-93.

* cited by examiner

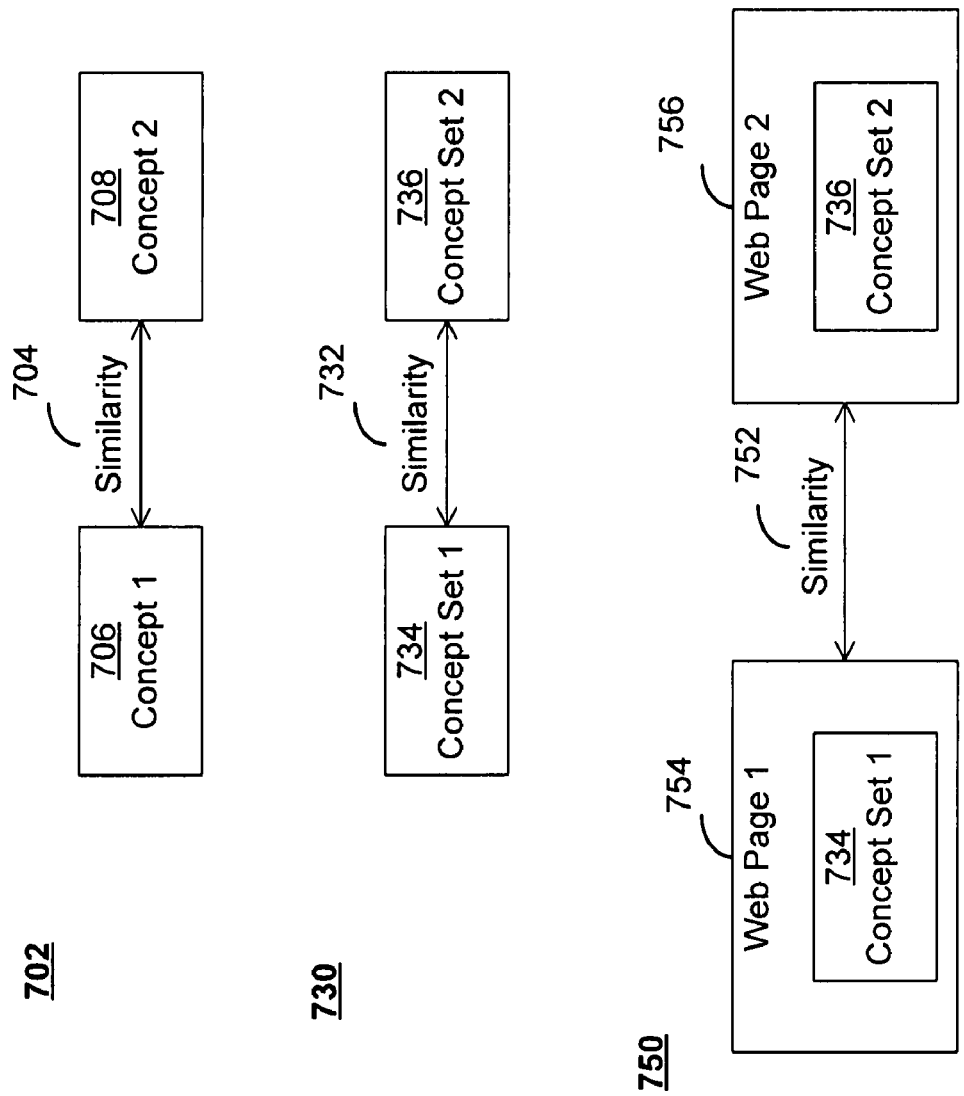

METHOD AND SYSTEM FOR ANALYZING
SIMILARITY OF CONCEPT SETS

TECHNICAL FIELD

This description relates to techniques for determining similar concept sets.

BACKGROUND

With the vast expansion of the Internet in recent years, users have demanded ever-increasing search capabilities to satisfy research needs. For example, a user may need to find multiple research resources to answer questions regarding a particular topic. The World Wide Web underwent rapid development in the 1990s. The development process provided insight into various shortcomings of the original model upon which the Web was based. For example, one shortcoming involved a role of text data, which was designed for human consumption. While humans may have a need to be able to read and understand the text data, such a representation may limit extents to which users may search for information.

More recently, a Web model, 2.0, has been developed to use content classification. In accordance with the model, Web-based text may be enriched with semantic information, in the form of meta-data, which may include a list or set of concepts associated with a web page. For example, if a web page includes information related to a person, the set of concepts associated with the page may include concepts related to the person's educational institution, favorite foods or allergies, workplace, and recreational preferences. For example, the concepts may include "MIT" as a concept for "school" and "Stanford" as a recreational preference, for example, for participating in sporting activities. The semantic information may thus provide a means for easily obtaining all kinds of seemingly unrelated information.

Conventional search engine capabilities include text-based searching, which may suffice for human searching. Conventional search engines may thus provide results based on matching bits of text. Therefore, if a user wants to find out if he/she can go swimming after work on a certain day, for example, after 8 p.m., at a location close to his/her home, the user may need to search for all swimming pools, look up the location for each pool as a conventional text-based search on swimming pools, look up hours of operation for each pool, and make a decision regarding the best choice.

Thus, it may be desirable to provide techniques which may improve determinations of similar concept sets.

SUMMARY

According to one general aspect, a system includes a concept analysis engine including a taxonomy manager configured to obtain a set of one or more taxonomies wherein each of the taxonomies includes one root node and one or more hierarchically ordered paths, wherein each hierarchically ordered path includes the root node and a hierarchically ordered sequence of concept nodes. A concept set engine may be configured to receive a first set of first set concepts and a second set of second set concepts. Further, a concept pair engine may be configured to determine a plurality of concept pairs, wherein each concept pair includes one of the first set concepts and one of the second set concepts. A hierarchical path engine may be configured to determine, for each one of the concept pairs, an associated length of a nondiverging intersection of a first subpath of one of the hierarchically ordered paths from the root node of one of the taxonomies to a first concept node representing the first set concept and a second subpath of one of the hierarchically ordered paths from the root node of the one of the taxonomies to a second concept node representing the second set concept, and an associated length of a first portion of the first subpath from a last concept node included in the nondiverging intersection to the first concept node, and an associated length of a second portion of the second subpath from the last concept node included in the nondiverging intersection to the second concept node. A concept similarity engine may be configured to determine pairwise similarity values associated with each of the concept pairs based on ratios based on associated lengths of nondiverging intersections determined by the hierarchical path engine and the associated lengths of the first and second portions, wherein a pairwise similarity value indicating a high similarity is determined for association with concept pairs associated with nonempty nondiverging intersections including the root node and hierarchically immediate successor nodes of the root node that are included in the first subpath and the second subpath. Further a concept set similarity engine may be configured to determine a concept set similarity value based on a weighted sum of the pairwise similarity values associated with optimal selected ones of the concept pairs.

According to another aspect, a method includes obtaining a set of one or more taxonomies wherein each of the taxonomies includes one root node and one or more hierarchically ordered paths, wherein each hierarchically ordered path includes the root node and a hierarchically ordered sequence of concept nodes. The method may further include receiving a first set of first set concepts and a second set of second set concepts. A plurality of concept pairs may be determined, wherein each concept pair includes one of the first set concepts and one of the second set concepts. The method further includes determining, for each one of the concept pairs, an associated length of a nondiverging intersection of a first subpath of one of the hierarchically ordered paths from the root node of one of the taxonomies to a first concept node representing the first set concept and a second subpath of one of the hierarchically ordered paths from the root node of the one of the taxonomies to a second concept node representing the second set concept, and an associated length of a first portion of the first subpath from a last concept node included in the nondiverging intersection to the first concept node, and an associated length of a second portion of the second subpath from the last concept node included in the nondiverging intersection to the second concept node. Pairwise similarity values associated with each of the concept pairs may be determined based on ratios based on associated lengths of nondiverging intersections determined by the determining the associated length of the nondiverging intersection and the associated lengths of the first and second portions, wherein a pairwise similarity value indicating a high similarity is determined for association with concept pairs associated with nonempty nondiverging intersections including the root node and hierarchically immediate successor nodes of the root node that are included in the first subpath and the second subpath. A concept set similarity value may be determined based on a weighted sum of the pairwise similarity values associated with optimal selected ones of the concept pairs.

According to yet another aspect, a computer program product is tangibly embodied on a computer-readable medium and is configured to cause a data processing apparatus to obtain a set of one or more taxonomies wherein each of the taxonomies includes one root node and one or more hierarchically ordered paths, wherein each hierarchically ordered path includes the root node and a hierarchically ordered sequence of concept nodes, receive a first set of first set concepts and a second set of second set concepts, determine a plurality of concept pairs, wherein each concept pair includes one of the first set concepts and one of the second set concepts, determine, for each one of the concept pairs, an associated length of a nondiverging intersection of a first subpath of one of the hierarchically ordered paths from the root node of one of the taxonomies to a first concept node representing the first set concept and a second subpath of one of the hierarchically ordered paths from the root node of the one of the taxonomies to a second concept node representing the second set concept, and an associated length of a first portion of the first subpath from a last concept node included in the nondiverging intersection to the first concept node, and an associated length of a second portion of the second subpath from the last concept node included in the nondiverging intersection to the second concept node, determine pairwise similarity values associated with each of the concept pairs based on ratios based on associated lengths of nondiverging intersections determined by the determining the associated length of the nondiverging intersection and the associated lengths of the first and second portions, wherein a pairwise similarity value indicating a high similarity is determined for association with concept pairs associated with nonempty nondiverging intersections including the root node and hierarchically immediate successor nodes of the root node that are included in the first subpath and the second subpath, and determine a concept set similarity value based on a weighted sum of the pairwise similarity values associated with optimal selected ones of the concept pairs.

The details of one or more implementations are set forth in the accompanying drawings and the description below. Other features will be apparent from the description and drawings, and from the claims.

BRIEF DESCRIPTION OF THE DRAWINGS

FIG. 7 illustrates example concept similarities according to an example embodiment.

DETAILED DESCRIPTION

Figure 1:
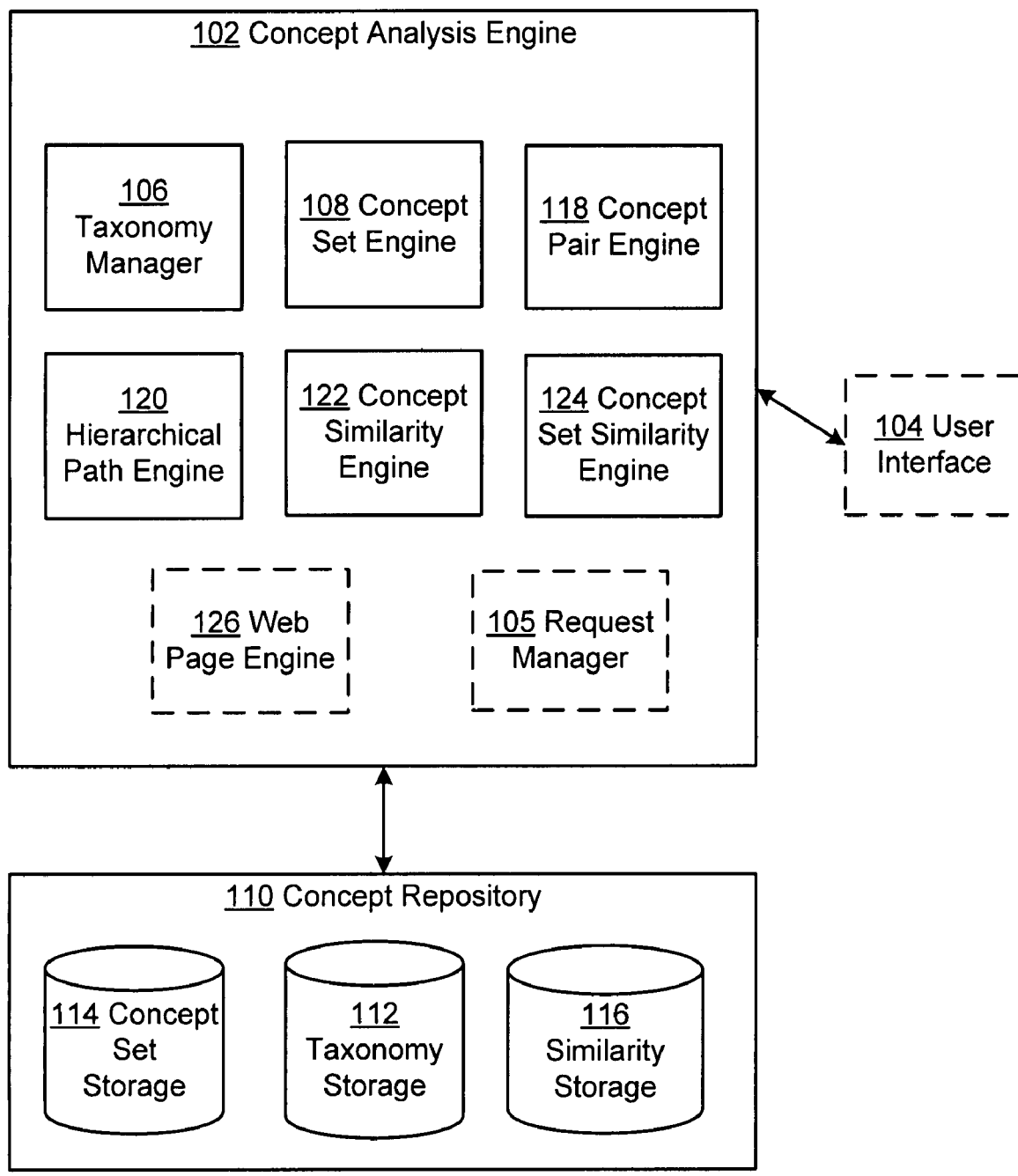
FIG. 1 is a block diagram of an example system for determining similar concept sets according to an example embodiment.

FIG. 1 is a block diagram of a system 100 for determining similar concept sets. In the example of FIG. 1, a concept analysis engine 102 may include various processing engines that provide and perform processing of concepts sets. According to an example embodiment, requests for similar concept sets may be received from a user, for example, via a user interface 104. According to an example embodiment, requests for similar concept sets may be received from a process, for example, to generate a concept dictionary. According to an example embodiment, a user may request a web page and similar web pages, for example, via the user interface 104.

For example, web pages may be classified by their underlying concepts and a concept classification system, or a concept dictionary may be used to search information in a more refined way than text-based searching. For example, a user may ask a search engine a question such as "Where can I go swimming today after 8 p.m. close to my home?" An example search engine based on techniques discussed herein may be able to provide a response to such a query based on determining a degree of similarity/difference between two concepts and pairs of concept sets.

According to an example embodiment, a request manager 105 may be configured to determine similar concept sets based on one or more concept set similarity values. For example, a user may request similar web pages based on one or more concept sets included in a particular web page. The request manager 105 may request similarity values, for example, of concept pairs, and of pairs of concept sets, to determine a similarity between pairs of semantically enriched web pages for the user.

The concept analysis engine 102 may include a taxonomy manager 106 configured to obtain a set of one or more taxonomies wherein each of the taxonomies includes one root node and one or more hierarchically ordered paths, wherein each hierarchically ordered path includes the root node and a hierarchically ordered sequence of concept nodes. For example, a request to determine a similarity between two concepts may include a request for a taxonomy for a determination of the requested similarity. The similarity may be determined, for example, based on lengths of nondiverging intersections of hierarchically ordered subpaths of the hierarchically ordered paths.

According to an example embodiment, a concept set engine 108 may be configured to receive a first set of first set concepts and a second set of second set concepts. According to an example embodiment, the concept set engine 108 may receive a first web page and a second web page, wherein the first and second web pages may be associated with the first and second sets of concepts, respectively. For example, the first and second sets may include information included in metadata of the respective web pages. For example, the first set may include a semantic concept "plant" and the second set may include a semantic concept "animal."

According to an example embodiment, a concept repository 110 may be configured to store information associated with concepts. For example, taxonomies and representations of concepts and similarities may be stored in the concept repository 110. According to an example embodiment, the concept repository may include a taxonomy storage area 112 that may be configured to store taxonomy information associated with the one or more taxonomies. For example, the taxonomy manager 106 may be configured to obtain the set of one or more taxonomies from the taxonomy storage area 112. For example, the taxonomy manager 106 may obtain a concept dictionary represented as a taxonomy for determining a semantic similarity of two web pages.

According to an example embodiment, the concept repository 110 may include a concept set storage area 114 that may be configured to store concept set information associated with the first set and the second set. According to an example embodiment, the concept set engine 108 may be configured to store the first set and the second set in the concept set storage area 114.

According to an example embodiment, the concept repository 110 may include a similarity storage area 116 that may be configured to store a concept set similarity value and similarity information associated with pairwise similarity values and associated concept pairs as discussed further below.

An example concept pair engine 118 may be configured to determine a plurality of concept pairs, wherein each concept pair includes one of the first set concepts and one of the second set concepts. Thus, for example, the concept pair engine 118 may determine concept pairs of semantic concepts associated with pairs of web pages. For example, the semantic concepts may be included in metadata included in the web pages.

An example hierarchical path engine 120 may be configured to determine, for each one of the concept pairs, an associated length of a nondiverging intersection of a first subpath of one of the hierarchically ordered paths from the root node of one of the taxonomies to a first concept node representing the first set concept and a second subpath of one of the hierarchically ordered paths from the root node of the one of the taxonomies to a second concept node representing the second set concept, and an associated length of a first portion of the first subpath from a last concept node included in the nondiverging intersection to the first concept node, and an associated length of a second portion of the second subpath from the last concept node included in the nondiverging intersection to the second concept node. For example, the hierarchical path engine 120 may determine a length of a nondiverging intersection of a first subpath from a root node to a subconcept node representing "plant" and a second subpath from the root node to a subconcept node representing "animal" as discussed further below with regard to FIG. 3.

According to an example embodiment, a concept similarity engine 122 may be configured to determine pairwise similarity values associated with each of the concept pairs based on ratios based on associated lengths of nondiverging intersections determined by the hierarchical path engine and the associated lengths of the first and second portions, wherein a pairwise similarity value indicating a high similarity is determined for association with concept pairs associated with non-empty nondiverging intersections including the root node and hierarchically immediate successor nodes of the root node that are included in the first subpath and the second subpath. For example, the concept similarity engine 122 may determine a pairwise similarity value associated with the concept pair "plant" and "animal" based on ratios based on associated lengths of nondiverging intersections and first and second portions as discussed further below with regard to FIGS. 3-7. For example, the concept similarity engine 122 may store the similarity information associated with the pairwise similarity values and the associated concept pairs in the similarity storage area 116.

According to an example embodiment, a concept set similarity engine 124 may be configured to determine a concept set similarity value based on a weighted sum of the pairwise similarity values associated with optimal selected ones of the concept pairs. For example, the concept set similarity engine 124 may determine a concept set similarity value based on a weighted sum of the pairwise similarity values associated with optimal selected ones of the concept pairs as discussed further below with regard to FIGS. 3-7. For example, the optimal pairing may be based on maximal sum values associated with respective concept pairs. For example, the concept set similarity engine 124 may store the concept set similarity value in the similarity storage area 116.

According to an example embodiment, a web page engine 126 may be configured to obtain web pages, wherein each web page includes a set of one or more semantic concepts. For example, a user may request one or more web pages via the user interface 104 as discussed previously.

One skilled in the art of data processing will appreciate that many different types of concept sets may be used by the concept set engine 108. Further, there may be many different ways to determine similarities of concept sets based on taxonomies as discussed herein.

Example methods and systems are discussed herein for determining similarities of concept sets. Example methods and systems may enhance the accessibility to similar concept sets such as semantically enhanced web pages. For example, a "concept dictionary" may be stored in the taxonomy storage area 112. The example concept dictionary may be represented as a taxonomy, or a hierarchical structure of concepts (e.g., a "red car" may be a subconcept of a superconcept "car"). The example taxonomy may be represented or modeled as a directed graph.

An example input may include a pair of web pages that a user may wish to compare. The pair of web pages may be represented as an unordered set of concepts. A similarity between the web pages may be determined, for example, based on similarities between each pair of concepts, and based on combining the pairwise similarities into an aggregate score. According to an example embodiment, a similarity measure of two concepts may represent relative locations of the two concepts with respect to a root element in the example directed graph associated with the taxonomy.

Figure 2:
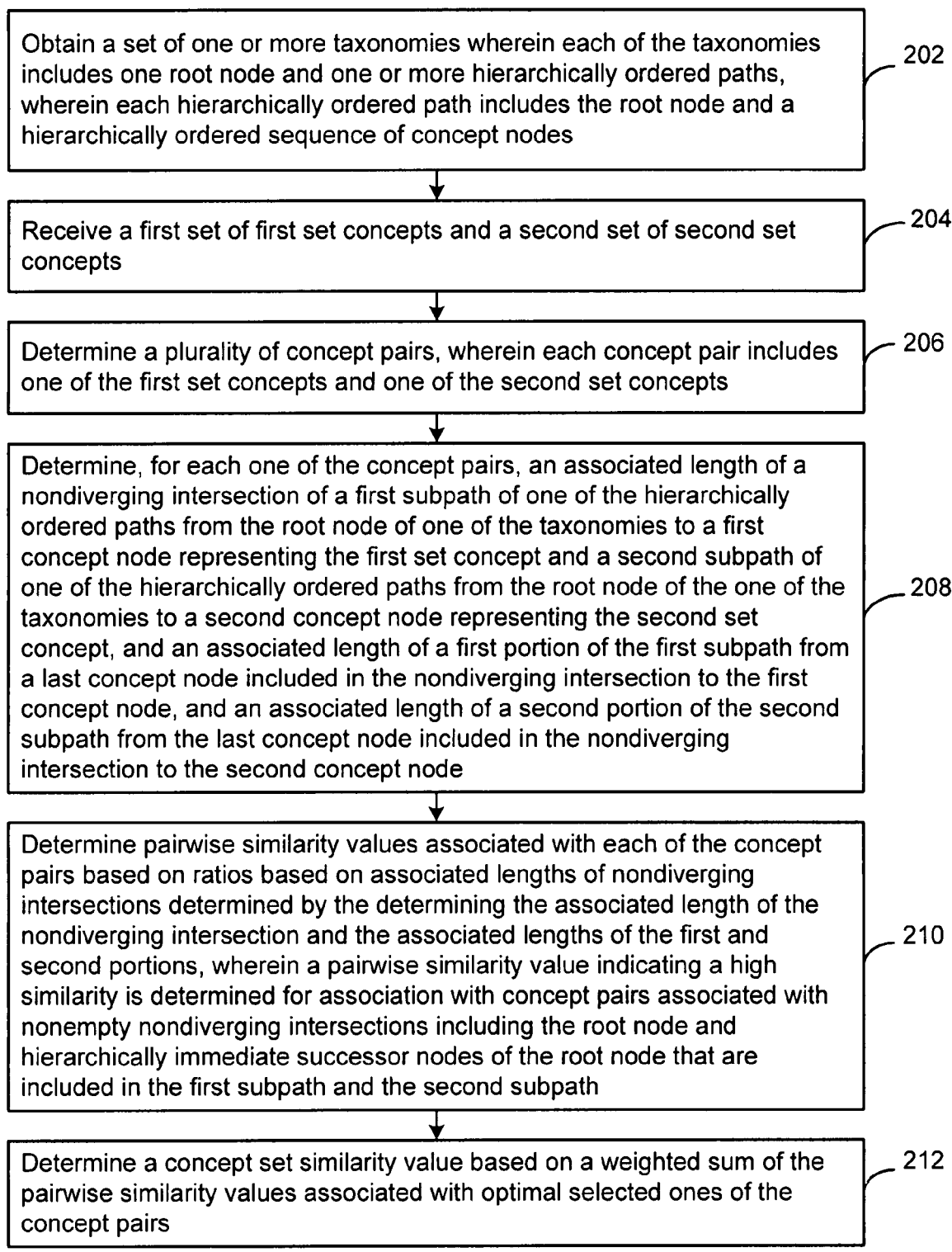
FIG. 2 is a flowchart illustrating an operation of the example system of FIG. 1.

FIG. 2 is a flowchart illustrating an example operation of the system of FIG. 1. According to an example embodiment, a set of one or more taxonomies may be obtained wherein each of the taxonomies includes one root node and one or more hierarchically ordered paths, wherein each hierarchically ordered path includes the root node and a hierarchically ordered sequence of concept nodes (202). For example, the taxonomy manager 106 may obtain a set of one or more taxonomies wherein each of the taxonomies includes one root node and one or more hierarchically ordered paths, wherein each hierarchically ordered path includes the root node and a hierarchically ordered sequence of concept nodes. For example, the taxonomy manager 106 may obtain a concept dictionary from the taxonomy storage area 112.

A first set of first set concepts and a second set of second set concepts may be received (204). For example, the concept set engine 108 may receive a first set of first set concepts and a second set of second set concepts as discussed previously. For example, the first and second sets may include information included in metadata of the respective web pages. For example, the first set may include a semantic concept "plant" and the second set may include a semantic concept "animal."

A plurality of concept pairs may be determined, wherein each concept pair includes one of the first set concepts and one of the second set concepts (206). For example, the concept pair engine 118 may determine a plurality of concept pairs, wherein each concept pair includes one of the first set concepts and one of the second set concepts. For example, the concept pair engine 118 may determine concept pairs of semantic concepts associated with pairs of web pages. For example, the semantic concepts may be included in metadata included in the web pages.

For each one of the concept pairs, an associated length may be determined of a nondiverging intersection of a first subpath of one of the hierarchically ordered paths from the root node of one of the taxonomies to a first concept node representing the first set concept and a second subpath of one of the hierarchically ordered paths from the root node of the one of the taxonomies to a second concept node representing the second set concept, and an associated length of a first portion of the first subpath from a last concept node included in the nondiverging intersection to the first concept node, and an associated length of a second portion of the second subpath from the last concept node included in the nondiverging intersection to the second concept node (208). For example, the hierarchical path engine 120 may determine a length of a nondiverging intersection of a first subpath from a root node to a subconcept node representing "plant" and a second subpath from the root node to a subconcept node representing "animal" as discussed further below with regard to FIG. 3.

Pairwise similarity values associated with each of the concept pairs may be determined based on ratios based on associated lengths of nondiverging intersections determined by the determining the associated length of the nondiverging intersection and the associated lengths of the first and second portions, wherein a pairwise similarity value indicating a high similarity is determined for association with concept pairs associated with nonempty nondiverging intersections including the root node and hierarchically immediate successor nodes of the root node that are included in the first subpath and the second subpath (210). For example, the concept similarity engine 122 may determine pairwise similarity values associated with each of the concept pairs based on ratios based on associated lengths of nondiverging intersections determined by the determining the associated length of the nondiverging intersection and the associated lengths of the first and second portions, wherein a pairwise similarity value indicating a high similarity is determined for association with concept pairs associated with nonempty nondiverging intersections including the root node and hierarchically immediate successor nodes of the root node that are included in the first subpath and the second subpath. For example, the concept similarity engine 122 may determine a pairwise similarity value associated with the concept pair "plant" and "animal" based on ratios based on associated lengths of nondiverging intersections and first and second portions as discussed further below with regard to FIGS. 3-7.

A concept set similarity value may be determined based on a weighted sum of the pairwise similarity values associated with optimal selected ones of the concept pairs (212). For example, the concept set similarity engine 124 may determine a concept set similarity value based on a weighted sum of the pairwise similarity values associated with optimal selected ones of the concept pairs as discussed further below with regard to FIGS. 3-7. For example, the optimal pairing may be based on maximal sum values associated with respective concept pairs.

According to an example embodiment, a semantic structure may be represented as a directed graph of nodes representing concepts that may be super- and sub-concepts of other concepts, or that may be in a custom-defined relationship with other concepts.

An example "taxonomy" as discussed herein may refer to a set that includes one or more concepts, and a set of asymmetric pairwise superconcept and subconcept relationships associated with those concepts. According to an example embodiment, each concept may have at least one such relationship, superconcept and subconcept relationships may be strictly one-way, and the set of relationships may not close a loop and thus there may be no subconcept chain or hierarchical path that includes the same concept twice, for example, the set of relationships is acyclic.

According to an example embodiment, an example taxonomy may include at least one concept with no superconcept. Thus, the example taxonomy may include an abstract concept, which may be defined as a superconcept of the elements, which do not otherwise have a superconcept. According to an example embodiment, a taxonomy may include a 'root' concept, which may be a superconcept of all other concepts of the taxonomy.

According to an example embodiment, taxonomies may be represented as directed graphs, wherein the nodes may represent concepts, and the edges may represent superconcept and subconcept relationships between pairs of nodes. Thus, an example graph corresponding to such a taxonomy may be contiguous, may include no loops, and may include a distinguished root node.

According to an example embodiment, the root node of a taxonomy may provide a user with a description of every node of the directed graph with respect to its location relative to the root. The relative location may be represented, for example, by a set of subconcept chains, or hierarchically ordered sequences of nodes, or "paths" extending from the root node to any other node of the directed graph. According to an example embodiment, a node may be reached via multiple different paths from the root.

According to an example embodiment, the edges of the graph may be numbered, or enumerated. For example, for each node of a taxonomy, the outgoing or exit edges of the node may be identified uniquely, in an arbitrary order; thus, the outgoing or exit edges of each node (if the node has outgoing edges) may be numbered as the first edge, the second edge, etc. This type of numbering may thus correspond to a first subconcept, a second subconcept, etc., of the concept represented by the superconcept or parent node. One skilled in the art of data processing will appreciate that many other types of branch or node indicators may be used other than digits, to identify the edges.

According to an example embodiment, each taxonomy may include a root node and one or more hierarchically ordered paths. Each hierarchically ordered path includes the root node and a hierarchically ordered sequence of concept nodes, wherein the hierarchically ordered sequence includes an ordering based on a hierarchically ordered path positioning of concept nodes representing superconcepts before concept nodes representing subconcepts of associated superconcepts based on a concept hierarchy.

According to an example embodiment, each taxonomy may include a root node and one or more hierarchically ordered paths. Each hierarchically ordered path includes the root node and a hierarchically ordered sequence of concept nodes, wherein the hierarchically ordered sequence includes an ordering based on a hierarchically ordered path positioning of concept nodes, wherein concept nodes representing parent superconcepts immediately precede concept nodes representing child subconcepts of associated parent superconcepts representing superconcepts in the hierarchically ordered path, based on a concept hierarchy.

According to an example embodiment, each taxonomy may include a root node and one or more hierarchically ordered paths. Each hierarchically ordered path may be associated with an enumerated path representation including an ordered sequence of identifiers of branches from hierarchical predecessor nodes to each immediate hierarchical successor node in the each hierarchically ordered path, based on a concept hierarchy. According to an example embodiment, the hierarchical path engine 120 may determine, for each one of the concept pairs, the associated length of the nondiverging intersection based on a comparison of enumerated path representations associated with each of the first concept node representing the first set concept, and the second concept node representing the second set concept. According to an example embodiment, each enumerated path representation may include an ordered sequence of numeric identifiers of branches from hierarchical predecessor nodes to each immediate hierarchical successor node in the each hierarchically ordered path, based on a concept hierarchy.

According to an example embodiment, the concept similarity engine 124 may determine pairwise similarity values associated with each of the concept pairs based on ratios based on first functions of associated lengths of nondiverging intersections determined by the hierarchical path engine and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first subpath and the second subpath.

Figure 3:
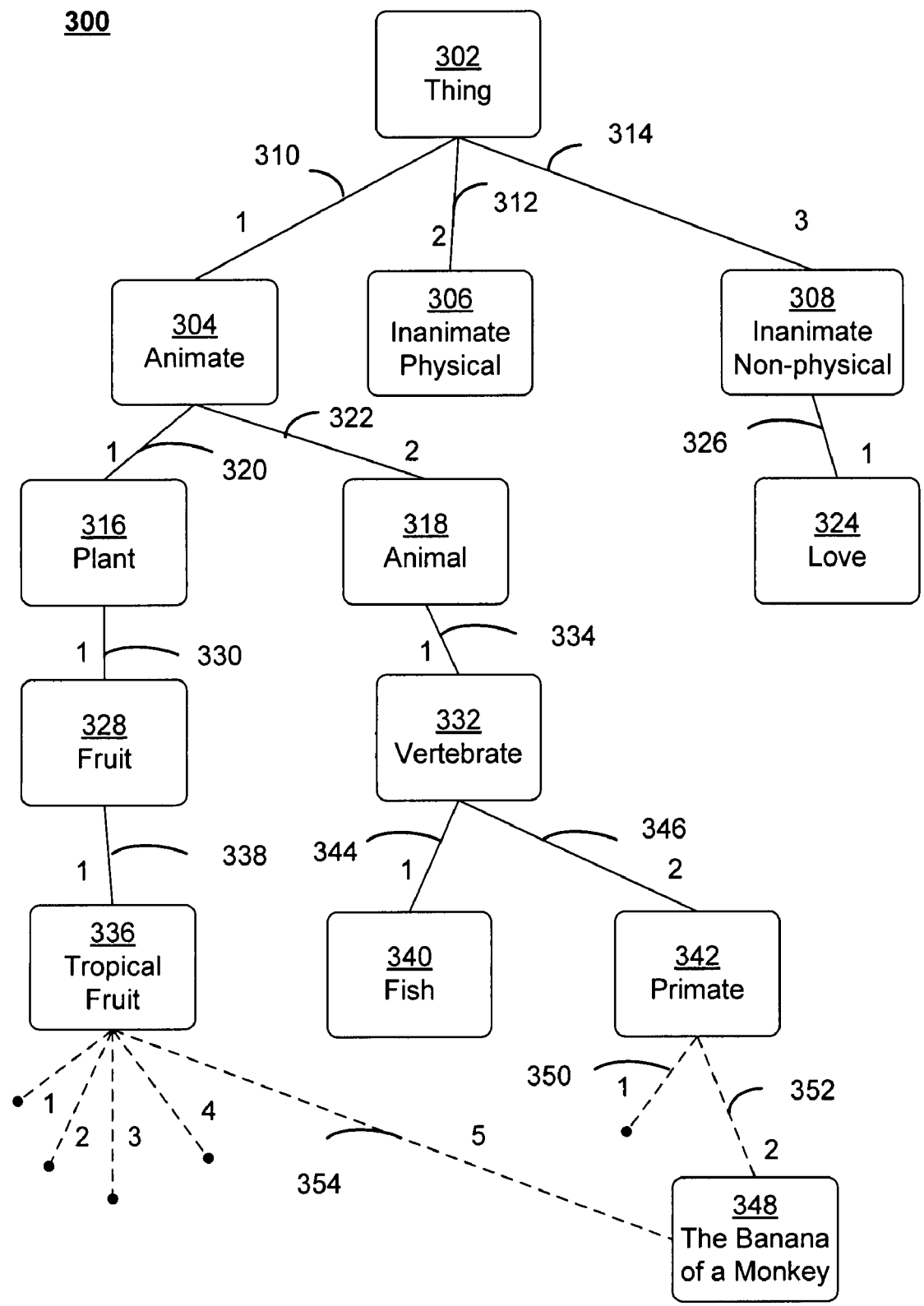
FIG. 3 depicts an example taxonomy of concept nodes according to an example embodiment.

FIG. 3 depicts an example taxonomy 300 according to an example embodiment. The example taxonomy 300 may be viewed as a directed graph having no cycles, that is, the directed graph is acyclic. As shown in FIG. 3, a root node 302 may represent a base concept or superconcept, for example, a "thing." The taxonomy 300 may include hierarchical subconcepts of each concept. For example, three hierarchical subconcepts of the root node 302 may include a hierarchical subconcept node 304 representing a concept "animate," a hierarchical subconcept node 306 representing a concept "inanimate physical," and a hierarchical subconcept node 308 representing a concept "inanimate non-physical." For example, the "animate" concept may include a living being or object. For example, the "inanimate physical" concept may include a non-living object such as a rock, car, or pencil. For example, the "inanimate non-physical" concept may include an idea, a feeling, or a thought.

As shown in FIG. 3, each of the hierarchical subconcept nodes 304, 306, 308 are connected to the root node 302 via an edge 310, 312, 314, respectively, indicating a hierarchical ordering of the nodes. Thus, the root node 302 may be referred to herein as a "superconcept" or "parent concept," or "immediate predecessor" node of each of the subconcept nodes 304, 306, 308. Further, each of the hierarchical subconcept nodes 304, 306, 308 may be referred to herein as "subconcept" nodes, "child" nodes, or "immediate successor" nodes of the root node 302. According to an example embodiment, the edges 310, 312, 314 may be associated with an indicator of a particular branch from the root node 302 to respective ones of the hierarchical subconcept nodes 304, 306, 308. According to an example embodiment, the edges 310, 312, 314 may be associated with an enumerated indicator of a particular branch from the root node 302 to respective ones of the hierarchical subconcept nodes 304, 306, 308. For example, the edge 310 may be enumerated as "1" and the edges 312, 314 may be enumerated as "2" and "3" respectively to indicate branches in the taxonomy 300 from the root node 302 to the respective hierarchical subconcept nodes 304, 306, 308.

As shown in the example of FIG. 3, the hierarchical subconcept node 304 depicts a concept node representing the concept "animate." Further, the node 304 may be a superconcept node of other concept nodes. For example, two hierarchical subconcepts of the hierarchical subconcept node 304 may include a hierarchical subconcept node 316 representing a concept "plant" and a hierarchical subconcept node 318 representing a concept "animal." As shown in FIG. 3, each of the hierarchical subconcept nodes 316, 318 are connected to the hierarchical subconcept node 304, or node 304, via an edge 320, 322, respectively, indicating a hierarchical ordering of the nodes. According to an example embodiment, the edges 320, 322 may be associated with an enumerated indicator of a particular branch from the root node 304 to respective ones of the hierarchical subconcept nodes 316, 318. For example, the edge 320 may be enumerated as "1" and the edge 322 may be enumerated as "2" to indicate branches in the taxonomy 300 from the node 304 to the respective hierarchical subconcept nodes 316, 318.

Additionally, the hierarchical subconcept node 308 depicts a concept node representing the concept "inanimate non-physical." Further, the node 308 may be a superconcept node of other concept nodes. For example, a hierarchical subconcept of the hierarchical subconcept node 308 may include a hierarchical subconcept node 324 representing a concept "love." As shown in FIG. 3, the hierarchical subconcept node 324 is connected to the hierarchical subconcept node 308, or node 308, via an edge 326 indicating a hierarchical ordering of the nodes. For this example, the edge 326 may be enumerated as "1" to indicate a branch in the taxonomy 300 from the node 308 to the hierarchical subconcept node 324.

As further shown in the example of FIG. 3, the hierarchical subconcept node 328 depicts a concept node representing the concept "fruit." Further, the node 316 representing the concept "plant" may be a superconcept node of the subconcept node 328. As shown in FIG. 3, the hierarchical subconcept node 328 is connected to the hierarchical subconcept node 316, or node 316, via an edge 330 indicating a hierarchical ordering of the nodes. For this example, the edge 330 may be enumerated as "1" to indicate a branch in the taxonomy 300 from the node 316 to the hierarchical subconcept node 328. Similarly, a subconcept node 332 representing the concept "vertebrate" is connected to the node 318 as a superconcept via an edge 334 enumerated as "1" to indicate a branch in the taxonomy 300 from the node 318 to the hierarchical subconcept node 332.

Further, a subconcept node 336 representing a concept "tropical fruit" is connected to the node 328 as a superconcept via an edge 338 enumerated as "1" to indicate a branch in the taxonomy 300 from the concept node 328 representing the concept "fruit" to the hierarchical subconcept node 336 representing the concept "tropical fruit."

As further shown in the example of FIG. 3, the hierarchical subconcept node 332 depicts a concept node representing the concept "vertebrate," shown as a superconcept node of two hierarchical subconcept nodes 340, 342 representing subconcepts "fish" and "primate" respectively. As shown in FIG. 3, each of the hierarchical subconcept nodes 340, 342 are connected to the hierarchical subconcept node 332, or node 332, via an edge 344, 346, respectively, indicating a hierarchical ordering of the nodes. The edges 344, 346 are enumerated as "1" and "2" respectively to indicate branches from the superconcept node 332 to each of the subconcept nodes 340, 342.

A subconcept node 348 representing a subconcept "the banana of a monkey" is depicted in FIG. 3 as a subconcept of two superconcept nodes 336 and 342. The superconcept node 342 includes two exit edges 350 and 352, enumerated as "1" and "2" to subconcept nodes. The superconcept node 336 includes an exit edge 354 to the subconcept node 348, and thus the subconcept node 348 depicts the concept "the banana of a monkey" as a subconcept of both "tropical fruit" and "primate." The superconcept node 336 is shown as including five exit edges enumerated with digits "1" through "5" to indicate branches from the superconcept node 336 to each of the subconcept node 348 and four other subconcept nodes (not shown).

The taxonomy 300 may be viewed as including hierarchically ordered paths or hierarchical ordered sequences of nodes from superconcept nodes to subconcept nodes that are connected via the edges connecting the subconcept nodes to respective superconcept nodes. For example, a hierarchical path from the root node 302 to the subconcept node 340 may be represented as a vector indicating enumerated branches along a hierarchical path from the root node 302 to the subconcept node 340. Thus, a vector "1 2 1 1" may indicate a hierarchical path including the root node 302, the edge 310, the subconcept node 304, the edge 322, the subconcept node 318, the edge 334, the subconcept node 332, the edge 344, and the subconcept node 340. As another example, a hierarchical path from the root node 302 to the subconcept node 342 may be represented as a vector indicating enumerated branches along a hierarchical path from the root node 302 to the subconcept node 342. Thus, a vector "1 2 1 2" may indicate a hierarchical path including the root node 302, the edge 310, the subconcept node 304, the edge 322, the subconcept node 318, the edge 334, the subconcept node 332, the edge 346, and the subconcept node 342. A length of the hierarchical path may indicate a count of edges or nodes included in the hierarchical path. Thus, the hierarchical path indicated by the vector "1 2 1 2" may have a length of five (indicating node count) or four (indicating edge count).

A nondiverging intersection of the two hierarchical paths discussed above may be determined, for example, by intersecting the two vectors "1 2 1 1" and "1 2 1 2" to generate a vector indicating a subpath "1 2 1" indicating the subpath from the root node 302 to the subconcept node 332. The length of such a nondiverging intersection may be four (indicating node count) or three (indicating edge count).

As yet another example, a first hierarchical path from the root node 302 to the subconcept node 348 may be represented as a vector "1 1 1 1 5" and a second hierarchical path may be represented as a vector "1 2 1 2 2" based on two different hierarchical subpaths from the root node 302 to the subconcept node 348. While the first and second hierarchical subpaths intersect at the root node 302, the edge 310, the subconcept node 304, and the subconcept node 348, a nonempty nondiverging intersection of the first and second hierarchical paths from the root node 302 to the subconcept node 348 may include only the root node 302, the edge 310, and the subconcept node 304.

Figure 4:
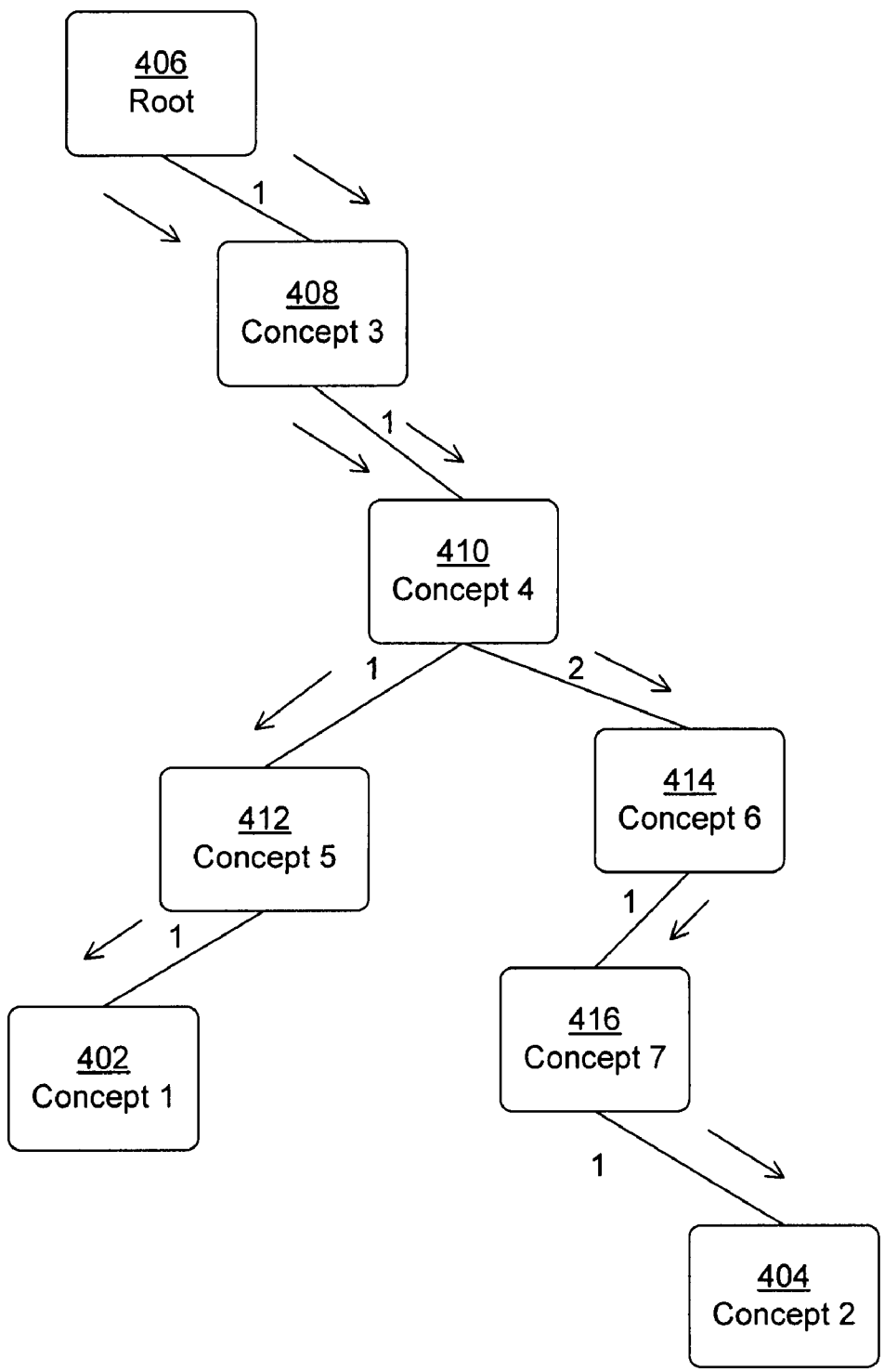
FIG. 4 illustrates example overlapping hierarchical subpaths of an example taxonomy.

FIG. 4 illustrates example overlapping hierarchical subpaths of an example taxonomy 400. As shown in FIG. 4, a concept1 node 402 and a concept2 node 404 may represent subconcepts of superconcepts in the taxonomy 400. A first hierarchical subpath from a root node 406 to the subconcept node 402 may include the root node 406, a concept3 node 408, a concept4 node 410, a concept5 node 412, and the subconcept node 402, with an enumerated path indicated as "1 1 1 1." Further, a second hierarchical subpath from the root node 406 to the subconcept node 404 may include the root node 406, the concept3 node 408, the concept4 node 410, a concept6 node 414, a concept7 node 416, and the subconcept node 404, with an enumerated path indicated as "1 1 2 1 1." A nondiverging nonempty intersection of the first and second hierarchical subpaths includes the root node 406, the concept3 node 408, the concept4 node 410, with an enumerated path "1 1." Thus, the example nondiverging nonempty intersection of the first and second hierarchical subpaths has a length of 2, based on an edge count, while a non-overlapping portion of the two subpaths has a length generated as 2+3=5.

Figure 5:
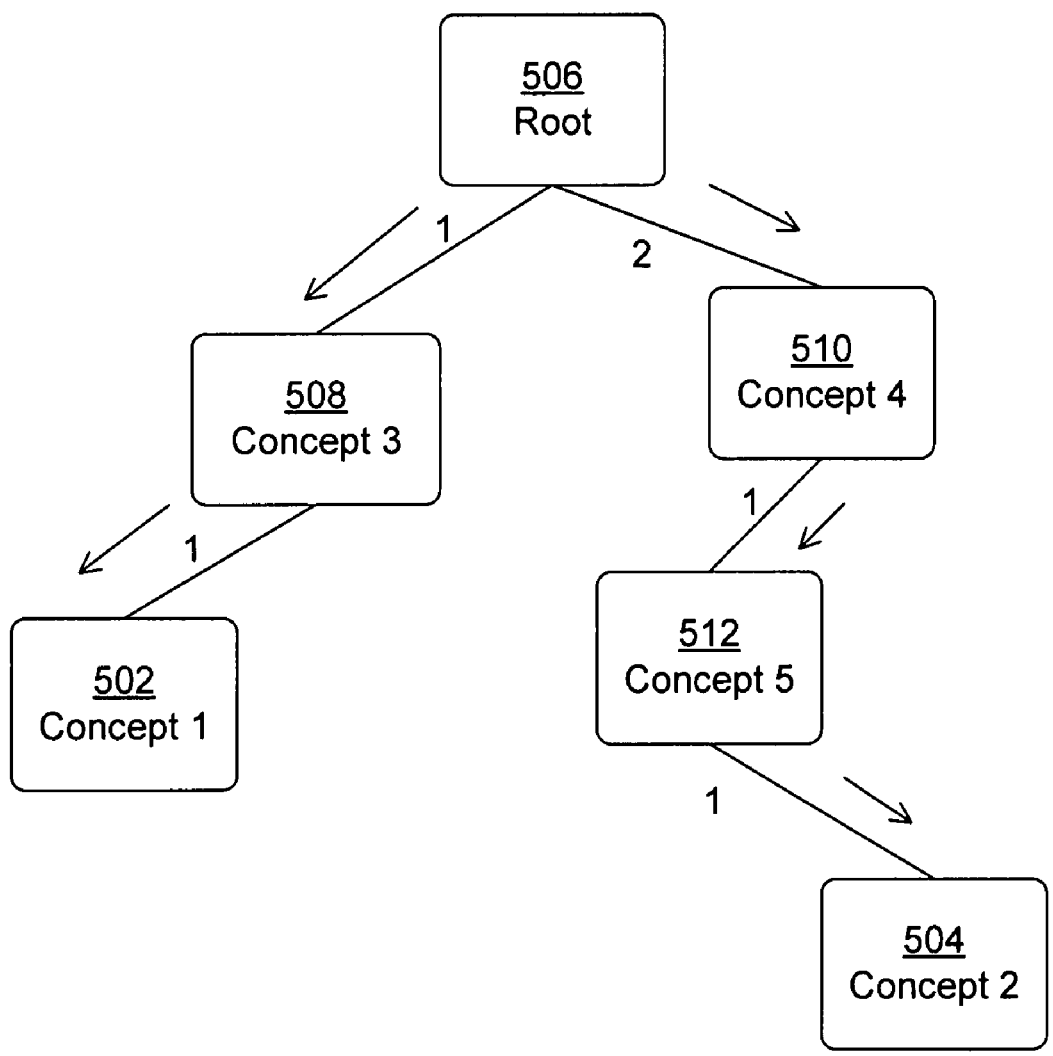
FIG. 5 illustrates example non-overlapping hierarchical subpaths of an example taxonomy.

FIG. 5 illustrates example non-overlapping hierarchical subpaths of an example taxonomy. As shown in FIG. 5, a concept1 node 502 and a concept2 node 504 may represent subconcepts of superconcepts in the taxonomy 500. A first hierarchical subpath from a root node 506 to the subconcept node 502 may include the root node 506, a concept3 node 508, and the subconcept node 502, with an enumerated path indicated as "1 1." Further, a second hierarchical subpath from the root node 506 to the subconcept node 504 may include the root node 506, a concept4 node 410, a concept5 node 512, and the subconcept node 504, with an enumerated path indicated as "2 1 1." A nondiverging nonempty intersection of the first and second hierarchical subpaths is empty for the example of FIG. 5. Thus, the example nondiverging nonempty intersection of the first and second hierarchical subpaths has a length of 0, based on an edge count, while a non-overlapping portion of the two subpaths has a length determined as 2+3=5.

Figure 6:
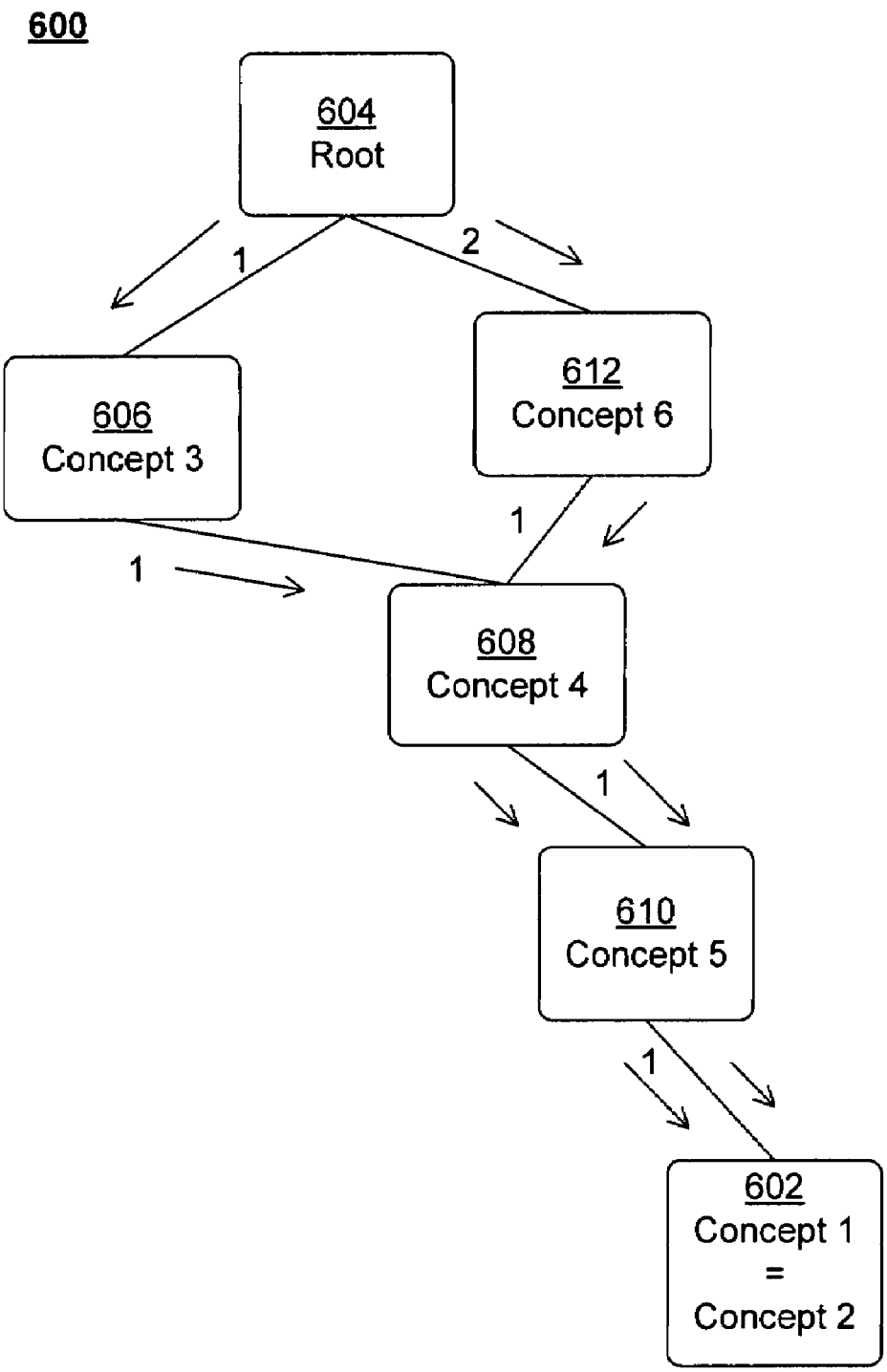
FIG. 6 illustrates example hierarchical subpaths of an example taxonomy that overlap after diverging.

FIG. 6 illustrates example hierarchical subpaths of an example taxonomy that overlap after diverging. As shown in FIG. 6, a concept1 node 602 and a concept2 node 602 may represent the same subconcept of superconcepts in the taxonomy 600. A first hierarchical subpath from a root node 604 to the subconcept node 602 may include the root node 604, a concept3 node 606, a concept4 node 608, a concept5 node 610, and the subconcept node 602, with an enumerated path indicated as "1 1 1 1." Further, a second hierarchical subpath from the root node 604 to the subconcept node 602 may include the root node 604, a concept6 node 612, the concept4 node 608, the concept5 node 610, and the subconcept node 602, with an enumerated path indicated as "2 1 1 1." A nondiverging nonempty intersection of the first and second hierarchical subpaths is empty for the example of FIG. 6. Thus, the example nondiverging nonempty intersection of the first and second hierarchical subpaths has a length of 0, based on an edge count, while a non-overlapping portion of the two subpaths has a length determined as 4+4=8.

FIG. 7 illustrates example concept similarities according to an example embodiment. As shown in FIG. 7, a pair of concepts 702 may have a similarity value 704 that may be determined based on a concept1 706 and a concept 2 708, similarly to the example techniques discussed previously. The concept1 706 and concept 2 708 may, for example, include semantic concepts, and thus the similarity value 704 may include a semantic similarity value associated with the pair of concepts 702.

Additionally, a pair of concept sets 730 may have a similarity value 732 that may be determined based on a concept set1 734 and a concept set2 736, similarly to the example techniques discussed previously. The concept set1 734 and concept set2 736 may, for example, include sets of semantic concepts, and thus the similarity value 732 may include a semantic similarity value associated with the pair of concept sets 730. According to an example embodiment, the concept set1 734 and concept set2 736 may be associated with a pair of web pages 750. Thus, a similarity value 752 may be determined for association with a web page1 754 associated with the concept set1 734, and a web page 2 756 associated with the concept set2 736. Thus, for example, a similarity value may be determined for pairs of web pages based on semantic similarity values associated with pairs of concept sets. Thus, for example, a user desiring swift access to related, or similar web pages, may determine similar web pages based on semantic similarity values associated with pairs of the web pages.

An example model for a taxonomy may provide a description of a relative location of every concept of the taxonomy in an example absolute reference system. In the example reference system, every concept may be described in terms of a set of subconcept chains or hierarchical sequences of nodes, or subpaths that originate at the root and terminate at the node representing the concept.

The following discussion provides example techniques for determining a similarity between two paths, and for measuring or determining a similarity between two concepts. An example similarity measure for each case may range from 0

(e.g., associated with no similarity, or substantially no similarity) to 1 (e.g., identity, or strong similarity, or high similarity).

According to an example embodiment, for a pair of paths, an overlapping section, or a nondiverging nonempty intersection, and its complement may be determined. Thus, the two paths may be identical on the overlapping section (e.g., having a similarity value =1) and may be completely disjoint on the remaining portion (e.g., having a similarity value =0).

An overall similarity between the two paths may be determined based on a linear combination, for example, a weighted average of the values 0 and 1.

According to an example embodiment, two paths may be referred to as being identical if all they proceed from the root of a taxonomy via an identical chain or hierarchical sequence of subconcepts. An overlapping section of two paths, or a nondiverging intersection of the two paths, may be a portion of the taxonomy which originates at the root, which includes identical subpaths; thus, the subpaths include an identical chain or hierarchical sequence of subconcepts.

Thus, an overlapping section of two paths, or a nondiverging intersection, may be determined based on the longest section or portion that originates at the root and is identical in both paths. The remainder of the two paths may thus be referred to as the non-overlapping section or portion.

While path partitions may not have a semantic meaning in themselves, the respective lengths of path partitions may indicate a similarity of the two paths. According to an example embodiment, a length of each partitioned section or portion may be used as a basis for constructing weighting functions. According to an example embodiment, a length of the overlapping section may be easily determined, as it is identical for each of the two paths. As for the non-overlapping section or portion, a length may be determined based on a sum of the lengths of the non-overlapping section or portion of each path (e.g., to ensure that the similarity measure is symmetric).

An example similarity between two hierarchical paths of an example taxonomy may be determined based on a weighted average of 0 and 1, according to a pair of example weighting functions f and g. Thus, a similarity $s_p$ may be generated according to an equation:

$$s_p = (1*f(j) + 0*g(k))/(f(j)+g(k)) = f(j)/(f(j)+g(k)), \quad (1)$$

wherein j and k represent respective lengths of the overlapping, or intersecting, and non-overlapping portions of the subpaths discussed previously.

For example weighting functions f(n), g(n), wherein n is a non-negative integer, f and g may be determined to satisfy:

(1) f(0)=g(0)=0, i.e., a subpath of no nodes carries no weight, or may indicate substantially no similarity; and
(2) For any n≧m, f(n)≧f(m) and g(n)≧g(m), i.e., a longer subpath may carry more weight, or may indicate a high similarity.

For example, functions f and g may be determined according to:

f(n)=2*n, and
g(n)=n, if one of the concepts is a subconcept of the other, and $n^2$ otherwise.

These example functions may generate higher similarity values for subpaths associated with pairs of concepts if one of the concepts is a subconcept of the other, and may punish those pairs of paths for which neither of the concepts is a subconcept of the other, for example, by generating low similarity values.

As discussed previously, the example nondiverging nonempty intersection of the first and second hierarchical subpaths of FIG. 4 has a length of 2, based on an edge count, while a non-overlapping portion of the two subpaths has a length generated as 2+3=5. Thus, a similarity between the two example subpaths may be determined as:

$$s_p = 2*2/(2*2+5^2) = 4/29. \quad (2)$$

According to an example embodiment, a similarity between two concepts may be determined as discussed below. Two concepts may be considered identical if a set of paths describing them in a taxonomy includes at least one identical pair of paths. Thus, according to an example embodiment, a similarity value for two concepts may be determined as the highest path similarity measure on a Cartesian product of the sets of paths describing each concept.

For example, concepts C1 and C2 may be described by a set of paths P1 and P2, respectively. The similarity of the two concepts C1 and C2 may then be determined as:

$$s_c(C1, C2) = \max(p1, p2), \text{ over all paths } p1 \text{ in } P1 \text{ and } p2 \text{ in } P2. \quad (3)$$

According to an example embodiment, a similarity between two web pages may be determined as discussed below. For example, the similarity of two web pages may be determined based on a concept-to-concept measure. As a general example, concepts from the two web pages may be paired such that a weighted sum of their pairwise similarities is maximal.

In order to determine such a pairing of the web pages, concept similarity scores may be calculated over a Cartesian product of the sets of concepts describing each web page, for example, sets of concepts associated with each web page. The resulting similarity values may, for example, be represented as a bipartite graph, wherein the nodes of each partition may correspond to concepts, and edges running between the two partitions may represent the respective similarity scores.

According to an example embodiment, a maximum bipartite matching algorithm may be used to determine an example pairing that may provide a highest total score, modified as needed to accommodate situations that may arise when the cardinality of the two partitions may not be equal. Although a maximum bipartite algorithm may yield optimal or near-optimal results, a less-optimal result may also be acceptable for some situations, as a significance of error may be small. Thus, if such an algorithm is determined to be overly costly, for example, in terms of computing resources because the pages include a large number of concepts, a simple greedy algorithm may be used. One skilled in the art of data processing will appreciate that many other techniques to determine such highest scoring pairings between two sets may also provide acceptable results.

According to an example embodiment, once a set of pairs is determined, their similarity values may be combined into an aggregate score. Such an aggregate score may be determined based on all outstanding concepts, or concepts that are not paired with another concept. For example, concepts may not all be paired with other concepts if the number of concepts associated with each web page is different from the numbers of concepts associated with other web pages.

According to an example embodiment, the pairwise concept similarity values may be sorted into descending order and weighted with a descending weighting function. According to an example embodiment, outstanding concepts may be considered to have weight 0, or may have substantially no weight.

For example, for pages P and Q including concepts $p_1 \ldots p_n$ and $q_1 \ldots q_m$, respectively, and weighting function f, a similarity between the pages may be determined as:

$$s_{page} = \sum_{i=1}^{\min(m,n)} (\text{score}(i) * f(i)) \bigg/ \sum_{i=1}^{\max(m,n)} (f(i)) \qquad (4)$$

According to an example embodiment, there may be min(m,n) pairs, and thus there may be max(m,n)−min(m,n) unpaired concepts. The unpaired concepts may be associated with a weight of 0, to obtain the equation (4) shown above.

For example, a function $f(i)=1/i$, an envelope function, may be determined. For example, $P=\{p_1, p_2, p_3, p_4\}$, and $Q=\{q_1, q_2, q_3, q_4, q_5, q_6\}$ may be obtained as concept sets. A similarity between all $(p_i, q_j)$ pairs may be generated, and may be stored and/or displayed via a matrix or table as shown below:

| | $q_j$ | | | | | |
|---|---|---|---|---|---|---|
| $p_i$/ | 1 | 2 | 3 | 4 | 5 | 6 |
| 1 | 0.25 | 0.8 | 0 | 0.3 | 1 | 0.7 |
| 2 | 0.3 | 0.24 | 1 | 0.1 | 0.1 | 0.4 |
| 3 | 0.68 | 0.4 | 0.1 | 0.2 | 0.5 | 0.5 |
| 4 | 0.8 | 0.2 | 0.1 | 0.72 | 0.06 | 0.3 |

An example pairing which yields a highest score sum is $\{(1\text{-}5), (2\text{-}3), (3\text{-}1), (4\text{-}4)\}$. For this example pairing, the corresponding similarity values sorted in descending order are then $S=\{1, 1, 10.72, 0.68\}$.

Therefore, the page similarity, or concept set similarity for this example, may be determined as $$s_{page} = \sum_{i=1}^{4} \left(s_i * \frac{1}{i}\right) \bigg/ \sum_{i=1}^{6} \left(\frac{1}{i}\right) = 1.91 \bigg/ \left(\frac{49}{20}\right) = 0.78$$

Example techniques discussed herein may provide a framework for evaluating a degree of similarity between two semantically enriched web pages, with respect to a taxonomy. The framework may consider the taxonomy as a directed graph with no loops. The degree of similarity between two pages may be calculated as a weighted sum of the similarities on an optimal pairing of the concepts associated with the pages. The degree of similarity between two concepts may be based on the relative size of the intersection of coordinate vectors describing the two concepts.

Thus, the example techniques discussed herein may provide a framework for measuring similarity of semantic content between two web pages.

According to an example embodiment, a semantic similarity measure may enhance search engine capabilities by recognizing two seemingly different web pages as similar. According to an example embodiment, a semantic similarity measure may help detect certain aspects of Web user behavior, for example, by determining when a user is refining his/her search information search. According to an example embodiment, a semantic similarity measure may also provide a basis for numeric evaluation of semantic information hierarchies.

The example techniques discussed herein may advantageously be used for upgrading of search capabilities, detecting example aspects of web user behavior (e.g., if the user is trying to refine a search), and/or numerical evaluation of a concept dictionary (e.g., for evaluation of an information hierarchy behind a search engine database).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
a concept analysis engine including one or more processors, the concept analysis engine comprising:
a taxonomy manager configured to obtain a set of one or more taxonomies wherein each of the taxonomies includes one root node and one or more hierarchically ordered paths, wherein each hierarchically ordered path includes the root node and a hierarchically ordered sequence of concept nodes;
a concept set engine configured to receive a first set of first set concepts and a second set of second set concepts;
a concept pair engine configured to determine a plurality of concept pairs, wherein each concept pair includes one of the first set concepts and one of the second set concepts;
a hierarchical path engine configured to determine, for each one of the concept pairs, an associated length of a non-diverging intersection of a first sub-path of one of the hierarchically ordered paths from the root node of one of the taxonomies to a first concept node representing the first set concept and a second sub-path of one of the hierarchically ordered paths from the root node of the one of the taxonomies to a second concept node representing the second set concept, and an associated length of a first portion of the first sub-path from a last concept node included in the non-diverging intersection to the first concept node, and an associated length of a second portion of the second sub-path from the last concept node included in the no-diverging intersection to the second concept node;
a concept similarity engine configured to determine pairwise similarity values associated with each of the concept pairs based on ratios based on associated lengths of non-diverging intersections determined by the hierarchical path engine and the associated lengths of the first and second portions, wherein a pairwise similarity value indicating a high similarity is determined for association with concept pairs associated with nonempty non-diverging intersections including the root node and hierarchically immediate successor nodes of the root node that are included in the first sub-path and the second sub-path; and
a concept set similarity engine configured to determine a concept set similarity value based on a weighted sum of the pairwise similarity values associated with optimal selected ones of the concept pairs.

2. The system of claim 1 wherein each one of the taxonomies includes one root node and one or more hierarchically ordered paths, wherein each hierarchically ordered path includes the root node and a hierarchically ordered sequence of concept nodes, wherein each of the concept nodes represents a concept, wherein the hierarchically ordered sequence includes an ordering based on a hierarchically ordered path positioning of concept nodes representing superconcepts before concept nodes representing subconcepts of associated superconcepts based on a concept hierarchy.

3. The system of claim 1 wherein each one of the taxonomies includes one root node and one or more hierarchically ordered paths, wherein each hierarchically ordered path includes the root node and a hierarchically ordered sequence of concept nodes, wherein each of the concept nodes represents a concept, wherein the hierarchically ordered sequence includes an ordering based on a hierarchically ordered path positioning of concept nodes, wherein concept nodes representing parent superconcepts immediately precede concept nodes representing child subconcepts of associated parent superconcepts representing superconcepts in the hierarchically ordered path, based on a concept hierarchy.

4. The system of claim 1 wherein each one of the taxonomies is acyclic.

5. The system of claim 1 wherein each of the concept nodes represents a semantic concept, each of the first set concepts represents a semantic concept, and each of the second set concepts represents a semantic concept.

6. The system of claim 1 wherein the concept analysis engine further comprises: a web page engine configured to obtain web pages, wherein each web page includes a set of one or more semantic concepts.

7. The system of claim 1 wherein each of the taxonomies includes one root node and one or more hierarchically ordered paths, wherein each hierarchically ordered path is associated with an enumerated path representation including an ordered sequence of identifiers of branches from hierarchical predecessor nodes to each immediate hierarchical successor node in the each hierarchically ordered path, based on a concept hierarchy, and wherein the hierarchical path engine is configured to determine, for each one of the concept pairs, the associated length of the nondiverging intersection based on a comparison of enumerated path representations associated with each of the first concept node representing the first set concept included in the each one of the concept pairs, and the second concept node representing the second set concept included in the each one of the concept pairs.

8. The system of claim 7 wherein each enumerated path representation includes an ordered sequence of numeric identifiers of branches from hierarchical predecessor nodes to each immediate hierarchical successor node in the each hierarchically ordered path, based on a concept hierarchy.

9. The system of claim 1 wherein the concept similarity engine is configured to determine pairwise similarity values associated with each of the concept pairs based on ratios based on first functions of associated lengths of nondiverging intersections determined by the hierarchical path engine and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first sub-path and the second sub-path.

10. The system of claim 1 wherein the concept similarity engine is configured to determine pairwise similarity values associated with each of the concept pairs based on ratios based on first functions of associated lengths of nondiverging intersections determined by the hierarchical path engine and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first sub-path and the second sub-path, wherein the ratios include weighted sums of values of the first and second functions divided by total sums of the values of the first and second functions.

11. The system of claim 1 wherein the concept similarity engine is configured to determine pairwise similarity values associated with each of the concept pairs based on ratios based on first functions of associated lengths of nondiverging intersections determined by the hierarchical path engine and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first sub-path and the second sub-path, wherein a value of the second function indicates a high concept similarity if the first concept includes a subconcept of the second concept, and otherwise indicates a low concept similarity.

12. The system of claim 1 wherein the concept similarity engine is configured to determine pairwise similarity values associated with each of the concept pairs based on ratios based on first functions of associated lengths of nondiverging intersections determined by the hierarchical path engine and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first sub-path and the second sub-path, wherein a value of the first function associated with the first sub-path is greater than a value of the first function associated with the second sub-path when the second sub-path includes a shorter path length than the first sub-path.

13. The system of claim 1 wherein the concept similarity engine is configured to determine pairwise similarity values associated with each of the concept pairs based on ratios based on first functions of associated lengths of nondiverging intersections determined by the hierarchical path engine and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first sub-path and the second sub-path, wherein a value of the second function associated with the first sub-path is greater than a value of the second function associated with the second sub-path when the second sub-path includes a shorter path length than the first sub-path.

14. The system of claim 1 wherein the concept similarity engine is configured to determine pairwise similarity values associated with each of the concept pairs based on ratios based on first functions of associated lengths of nondiverging intersections determined by the hierarchical path engine and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first sub-path and the second sub-path, wherein values of the first and second functions that are associated with empty sub-paths indicate substantially no weight.

15. The system of claim 1 wherein the concept set similarity engine is configured to determine the concept set similarity value based on determining a weighted sum of the pairwise similarity values associated with optimal selected ones of the concept pairs, wherein the optimal selected ones are determined based on determining maximal similarity values associated with each one of the concept pairs, wherein the weighted sum is based on a weighted sum of the maximal similarity values determined for each concept pair.

16. The system of claim 1 further comprising: a concept repository including: a taxonomy storage area configured to taxonomy information associated with the one or more taxonomies; a concept set storage area configured to store concept set information associated with the first set and the second set; and a similarity storage area configured to store the concept set similarity value and similarity information associated with the pairwise similarity values and the associated concept pairs, wherein: the taxonomy manager is configured to obtain the set of one or more taxonomies from the taxonomy storage area, the concept set engine is configured to store the first set and the second set in the concept set storage area, the concept similarity engine is configured to store the similarity information associated with the pairwise similarity values and the associated concept pairs in the similarity storage area, and the concept set similarity engine is configured to store the concept set similarity value in the similarity storage area.

17. The system of claim 1 further comprising: a user interface configured to receive requests for similar concept sets from a user; and a request manager configured to determine the similar concept sets based on one or more concept set similarity values.

18. The system of claim 17 wherein: the user interface is configured to receive requests for similar web pages associated with concept sets from a user, and the request manager is configured to determine the similar web pages based on the concept sets associated with the similar web pages based on the one or more concept set similarity values.

19. A method comprising: obtaining a set of one or more taxonomies wherein each of the taxonomies includes one root node and one or more hierarchically ordered paths, wherein each hierarchically ordered path includes the root node and a hierarchically ordered sequence of concept nodes; receiving a first set of first set concepts and a second set of second set concepts; determining a plurality of concept pairs, wherein each concept pair includes one of the first set concepts and one of the second set concepts; determining, for each one of the concept pairs, an associated length of a nondiverging intersection of a first sub-path of one of the hierarchically ordered paths from the root node of one of the taxonomies to a first concept node representing the first set concept and a second sub-path of one of the hierarchically ordered paths from the root node of the one of the taxonomies to a second concept node representing the second set concept, and an associated length of a first portion of the first sub-path from a last concept node included in the nondiverging intersection to the first concept node, and an associated length of a second portion of the second sub-path from the last concept node included in the nondiverging intersection to the second concept node; determining pairwise similarity values associated with each of the concept pairs based on ratios based on associated lengths of nondiverging intersections determined by the determining the associated length of the nondiverging intersection and the associated lengths of the first and second portions, wherein a pairwise similarity value indicating a high similarity is determined for association with concept pairs associated with nonempty nondiverging intersections including the root node and hierarchically immediate successor nodes of the root node that are included in the first sub-path and the second sub-path; and determining a concept set similarity value based on a weighted sum of the pairwise similarity values associated with optimal selected ones of the concept pairs.

20. The method of claim 19 wherein: obtaining the set of one or more taxonomies comprises obtaining the set of one or more taxonomies wherein each of the taxonomies includes one root node and one or more hierarchically ordered paths, wherein each hierarchically ordered path includes the root node and a hierarchically ordered sequence of concept nodes, wherein each of the concept nodes represents a concept, wherein each hierarchically ordered path is indicated by an associated ordered vector of branch indicators, wherein each branch indicator indicates an edge between an immediate predecessor concept node and an immediate successor node based on the hierarchically ordered sequence, and determining, for each one of the concept pairs, an associated length of a nondiverging intersection of a first sub-path comprises determining, for each one of the concept pairs, a nondiverging intersection of one of the vectors associated with the first sub-path of the one of the hierarchically ordered paths from the root node to the first concept node and one of the vectors associated with the second sub-path of the one of the hierarchically ordered paths from the root node to the second concept node.

21. The method of claim 19 wherein: receiving the first set comprises receiving a first web page associated with the first set including a plurality of first set concepts, wherein each first set concept represents a semantic concept, receiving the second set comprises receiving a second web page associated with the second set including a plurality of second set concepts, wherein each second set concept represents a semantic concept, and determining the concept set similarity value comprises determining the concept set similarity value between the first web page and the second web page based on determining a weighted sum of the pairwise similarity values associated with optimal selected ones of the concept pairs.

22. The method of claim 19 wherein determining the pairwise similarity values comprises: determining pairwise similarity values associated with each of the concept pairs based on ratios based on first functions of associated lengths of nondiverging intersections determined by the determining the associated length of the nondiverging intersection and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first sub-path and the second sub-path, wherein values of the first and second functions that are associated with empty sub-paths indicate substantially no weight.

23. The method of claim 19 wherein determining the concept set similarity value comprises: determining the concept set similarity value based on determining a weighted sum of the pairwise similarity values associated with optimal selected ones of the concept pairs, wherein the optimal selected ones are determined based on determining maximal similarity values associated with each one of the concept pairs, wherein the weighted sum is based on a weighted sum of the maximal similarity values determined for each concept pair.

24. A computer program product being tangibly embodied on a computer-readable storage medium and being configured to cause a data processing apparatus to:
obtain a set of one or more taxonomies wherein each of the taxonomies includes one root node and one or more hierarchically ordered paths, wherein each hierarchically ordered path includes the root node and a hierarchically ordered sequence of concept nodes;
receive a first set of first set concepts and a second set of second set concepts;
determine a plurality of concept pairs, wherein each concept pair includes one of the first set concepts and one of the second set concepts;
determine, for each one of the concept pairs, an associated length of a nondiverging intersection of a first sub-path of one of the hierarchically ordered paths from the root node of one of the taxonomies to a first concept node representing the first set concept and a second sub-path of one of the hierarchically ordered paths from the root node of the one of the taxonomies to a second concept node representing the second set concept, and an associated length of a first portion of the first sub-path from a last concept node included in the nondiverging intersection to the first concept node, and an associated length of a second portion of the second sub-path from the last concept node included in the nondiverging intersection to the second concept node;
determine pairwise similarity values associated with each of the concept pairs based on ratios based on associated lengths of nondiverging intersections determined by the determining the associated length of the nondiverging intersection and the associated lengths of the first and second portions, wherein a pairwise similarity value indicating a high similarity is determined for association with concept pairs associated with nonempty nondiverging intersections including the root node and hierarchically immediate successor nodes of the root node that are included in the first sub-path and the second sub-path; and
determine a concept set similarity value based on a weighted sum of the pairwise similarity values associated with optimal selected ones of the concept pairs.

25. The computer program product of claim 24 wherein the computer program is configured to cause the data processing apparatus to determine the pairwise similarity values based on determining pairwise similarity values associated with each of the concept pairs based on ratios based on first functions of associated lengths of nondiverging intersections determined by the determining the associated length of the nondiverging intersection and second functions of the associated lengths of the first and second portions, wherein a pairwise similarity value indicating a high similarity is determined for association with concepts pairs associated with nonempty nondiverging intersections including the root node and hierarchically immediate successor nodes of the root node that are included in the first sub-path and the second sub-path, wherein the ratios include weighted sums of values of the first and second functions divided by total sums of the values of the first and second functions.

26. The computer program product of claim 24 wherein the computer program is configured to cause the data processing apparatus to determine the concept set similarity value based on determining the concept set similarity value based on determining a weighted sum of the pairwise similarity values associated with optimal selected ones of the concept pairs, wherein the optimal selected ones are determined based on determining maximal similarity values associated with each one of the concept pairs, wherein the weighted sum is based on a weighted sum of the maximal similarity values determined for each concept pair.

* * * * *